(12) United States Patent
Lee

(10) Patent No.: US 9,598,026 B2
(45) Date of Patent: Mar. 21, 2017

(54) APPARATUS FOR CLAMPING DOOR TRIM OF VEHICLE

(71) Applicant: Hyundai Motor Company, Seoul (KR)

(72) Inventor: Joung Hae Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 14/570,816

(22) Filed: Dec. 15, 2014

(65) Prior Publication Data

US 2016/0031385 A1 Feb. 4, 2016

(30) Foreign Application Priority Data

Jul. 29, 2014 (KR) .......................... 10-2014-0096246

(51) Int. Cl.
*B60R 13/02* (2006.01)

(52) U.S. Cl.
CPC ...... *B60R 13/0206* (2013.01); *B60R 13/0243* (2013.01)

(58) Field of Classification Search
CPC ............ B29K 2075/00; B29K 2105/12; B60H 1/00285; B60H 2001/003; B60R 13/0243; B60R 13/0206; B60R 21/0428; B60R 2013/0287; B60R 13/02; B60R 2013/0281; B60J 5/0416; B60J 5/0418; B60J 5/0451; B60J 5/0468; B60J 5/0413; B60J 10/042; B60J 5/04
USPC ......... 296/146.7, 1.08, 153, 70, 146.1, 97.1; 49/502, 489.1, 503, 506; 280/728.2, 741, 280/801.1, 806
See application file for complete search history.

(56) References Cited

U.S. PATENT DOCUMENTS

| 7,111,893 | B2* | 9/2006 | Carter | B60J 5/0416 292/DIG. 23 |
|---|---|---|---|---|
| 8,172,305 | B2* | 5/2012 | Schmelz | B60J 5/0416 296/146.7 |
| 8,585,121 | B2* | 11/2013 | Marx | B60R 13/0206 24/289 |
| 2005/0235574 | A1* | 10/2005 | Gomez Camara | B60J 5/0416 49/502 |
| 2006/0265964 | A1 | 11/2006 | Winborn | |
| 2010/0225142 | A1 | 9/2010 | Mazur et al. | |
| 2011/0113598 | A1* | 5/2011 | Hofmann | B60R 13/0206 24/458 |
| 2011/0119875 | A1 | 5/2011 | Iwasaki | |

(Continued)

FOREIGN PATENT DOCUMENTS

| JP | 2000-247146 | 9/2000 |
|---|---|---|
| JP | 2002-264652 | 9/2002 |

(Continued)

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

An apparatus for clamping a door trim of a vehicle may include a plurality of clamping portions that are installed on a door trim side and include hooks caught by a door panel side while rotating by tension of a wire, a locking portion that is installed on the door trim side and pulls the wire using a rotating pulley, and the wire that is in a closed loop form between the hooks of the plurality of the clamping portions and the pulley of the locking portion and rotates the hooks while being pulled by the rotation of the pulley.

13 Claims, 7 Drawing Sheets

[AFTER ASSEMBLY]

(56) References Cited

U.S. PATENT DOCUMENTS

2013/0111816 A1* 5/2013 Kinoshita ............. E05F 11/382
49/376
2014/0300133 A1* 10/2014 Hinokio .............. B60R 13/0206
296/146.7

FOREIGN PATENT DOCUMENTS

JP 2006-298113 11/2006
KR 10-2014-0036569 3/2014

* cited by examiner

[BEFORE ASSEMBLY]

[AFTER ASSEMBLY]

APPARATUS FOR CLAMPING DOOR TRIM OF VEHICLE

CROSS-REFERENCE TO RELATED APPLICATION

The present application claims priority of Korean Patent Application Number 10-2014-0096246 filed on Jul. 29, 2014, the entire contents of which are incorporated herein for all purposes by this reference.

BACKGROUND OF THE INVENTION

Field of the Invention

The present disclosure relates to an apparatus for clamping a door trim of a vehicle. More particularly, it relates to a clamping apparatus that fixes a door trim to a door panel using a hook that rotates in response to tension of a wire.

Description of Related Art

In general, the door trim as an interior part of a car door serves as security of a comfortable cabin space and protection of functional parts, and such a door trim is assembled by a structure that is mounted to a door inner panel together with a door module.

For example, as shown in FIGS. 7A-7C, a door module 100 is mounted on a door inner panel 110 by hardware, such as screws, and a door trim 120 is mounted to the door inner part by a fastener 130.

However, in the case of the fastener 130 for fixing the door trim 120, there are disadvantages that the weak clamping force may result in weakening of overall supporting rigidity, and in order to make room for clamping a door module 100, there is a need to further extend the width of the door inner panel 110.

In the case of such a conventional door trim, there is a limit to weight reduction due to the fact that the separate door modules and door trims are applied, integration of the number of parts is more difficult, and due to security of a space for clamping the door module, there is a limit to reduce an opening portion of the door inner panel.

In recent years, in consideration of these points, there is a tendency to develop and apply a trim module having advantages, such as being capable of reducing the weight by simplifying the function by integration of components, that is, a trim module having a form in which the door trim and the door module are integrated with each other.

However, a new clamping structure is demanded for the application of the above-described trim module.

For example, in the case of the fastener for clamping the existing door trim, since the clamping force is weak, it is difficult to respond to the increased weight and function of the trim module, and when applying the hardware such as screws and bolts in place of such a fastener, there is a need to machine a tooling hole for clamping the hardware, but because the tooling hole is exposed to the external form of the door trim, it is difficult to apply the same in the terms of the external form merchantability.

Therefore, in order to reliably clamp the trim module, there is a need for a new clamping apparatus that has no strong mechanical coupling of a hardware level and exposure of the external form such as a tooling hole.

As background arts relevant to the present invention, there are Japanese Patent Laid-Open No. 2002-264652, Japanese Patent Laid-Open No. 2000-247146 and the like.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to solve the above-described problems associated with prior art and/or other problems, and the present invention is to provide an apparatus for clamping a door trim of a vehicle that is capable of securing a firm and reliable clamping state of the door trim, and improving the external form due to the deletion of the tooling hole or the like, by implementing a new type of a door trim wire clamping method having a combination of a clamping portion that operates in accordance with the wire tension by being connected by a single wire and a locking portion capable of adjusting the tension of the wire.

In accordance with various aspects of the present invention, the apparatus for clamping the door trim of a vehicle provided by the present invention has the following characteristics.

In one aspect, the present invention provides an apparatus for clamping a door trim of a vehicle that includes: a plurality of clamping portions installed on a door trim side and including hooks caught by a door panel side while rotating by tension of a wire; a locking portion that is installed on the door trim side and pulls the wire using a rotating pulley; and the wire that is in a closed loop form between the hooks of the plurality of the clamping portions and the pulley of the locking portion and rotates the hooks while being pulled by the rotation of the pulley.

In an aspect, a hook of one or each clamping portion may be rotatably supported on the door trim side by a pin, and comprise a hook portion caught in a hole of the door panel side and a groove portion that slidably catches the wire.

In another aspect, one or each clamping portion may further comprise a hook spring that resiliently supports a hook of the one or each clamping portion, while being mounted in a structure interposed between a door trim side inner surface and a back surface of the hook.

In still another aspect, the locking portion may include: a locking base installed on the door trim side; the pulley that is installed inside the locking base in a rotatable structure to pull or unwind the wire; a clamp that is installed in a structure rotatable inside the locking base and axially movable, wherein the clamp is able to rotate while being selectively engaged with the pulley, or the rotation of the clamp is restricted while the clamp is selectively engaged with the locking base; and a clamping spring that is resiliently interposed between the pulley and the clamp.

In yet another aspect, as a means capable of catching the wire, the pulley may include wire entry portions having a phase difference of a predetermined angle between the entry portions, and a wire insertion groove formed along a circumferential direction while communicating with the wire entry portions.

In still yet another aspect, the pulley and the clamp may be engaged with each other through an engagement structure between a plurality of engaging grooves of a first predetermined interval formed along an inner circumferential surface of the pulley and a plurality of engaging protrusions of a second predetermined interval formed on a back surface of the clamp along a circumferential direction.

Furthermore, the rotation of the clamp may be restricted by an engagement structure between a plurality of engaging grooves of a first predetermined interval formed along a circumferential direction on a front surface of the clamp and a plurality of engaging protrusions of a second predetermined interval formed along an inner circumferential surface of the locking base. A disengaged state with the pulley may be maintained while the clamp is caught by an engaging protrusion of the locking base through a corresponding engaging groove having a depth deeper than other engaging grooves among a plurality of engaging grooves formed on a front surface of the clamp.

The apparatus for clamping the door trim of the vehicle provided by the present invention has the following advantages.

First, by mounting the door trim using the clamping portion that operates by the wire tension pulled by the operation of the locking portion, it is possible to secure the firm and powerful mounting state.

Second, since it is possible to remove the hindrance factors of the external form such as the tooling holes, it is possible to secure the marketability according to an improvement in external form.

Third, since the clamping portions of multiple positions are clamped or released by operating at one position, mounting and removal thereof are very easy, thereby being able to improve the workability.

Fourth, it is possible to expect the effect of a significant weight reduction by the application of the trim module in which the door trim and the door module are combined with each other.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
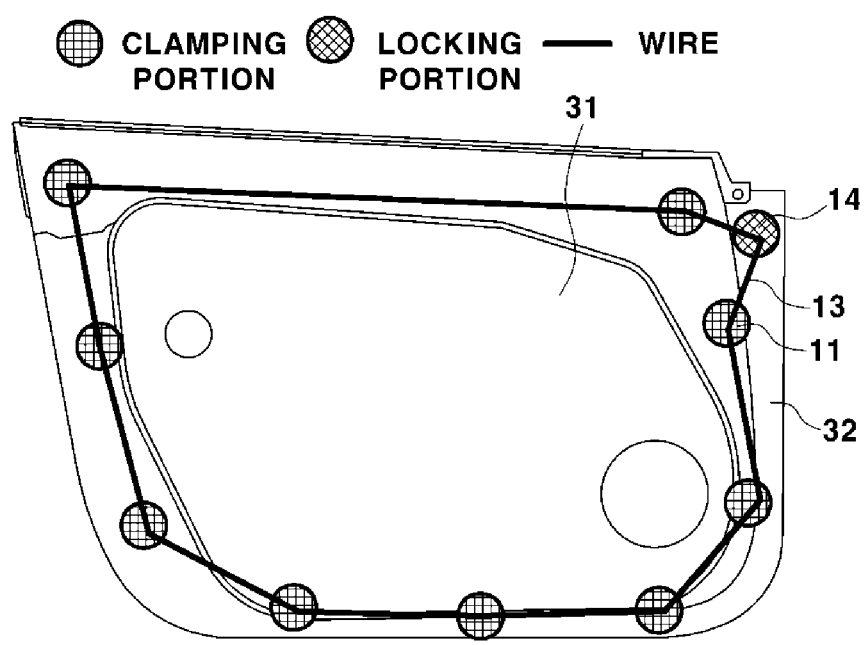
FIG. 1 is a front view showing positions of a clamping portion and a locking portion of an exemplary apparatus for clamping a door trim according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a front view showing the positions of the clamping portion and the locking portion of the apparatus for clamping the door trim according to various embodiments of the present invention. As shown in FIG. 1, here, a door trim 31, that is, an arrangement layout of a clamping portion 11 and a locking portion 14 for fixing a trim module in a form in which the door trim and the door module are combined with each other to a door panel 32 is shown.

The locking portion 14 is an operation means for pulling or unwinding a wire 13, and at least one locking portion is provided on one side of the door trim 31. Such a locking portion 14 serves to operate the clamping portion 11 by pulling the wire 13 wound around the pulley side using the rotatable pulley, and this will be described in detail later.

The clamping portion 11 is a portion that is substantially caught by the side door panel 32, and a plurality of clamping portions can be provided at appropriate positions while following the periphery of the entire edges of the door trim. The clamping portion 11 is a portion that is caught by the door panel side using the hook rotated by the tension of the wire, and this will to be described later in detail.

Moreover, the wire 13 pulled or unwound by the operation of the locking portion 14 is constituted by one wire having a closed loop form that passes through the locking portion 14 and the respective clamping portions 11.

Therefore, when pulling the wire 13 by operating the locking portion 14, hooks provided in each of the clamping portions 11 can be clamped to the hole of the door panel side while being simultaneously rotationally operated by the wire tension, and as the result, the door trim 31 can be firmly assembled to the door panel 32 by the clamping operation of the clamping portion 11.

Figure 2A:
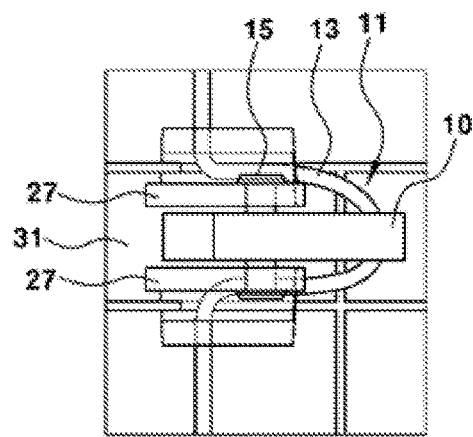
FIG. 2A, FIG. 2B, and FIG. 2C are perspective views showing the clamping portion of an exemplary apparatus for clamping a door trim according to the present invention.
Figure 2B:
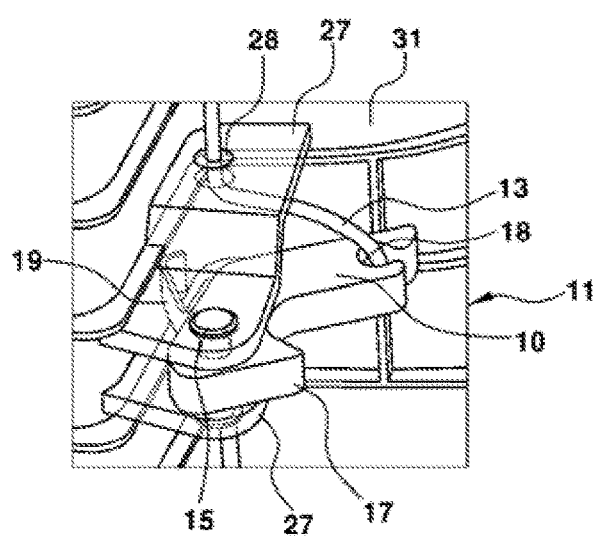
Figure 2C:
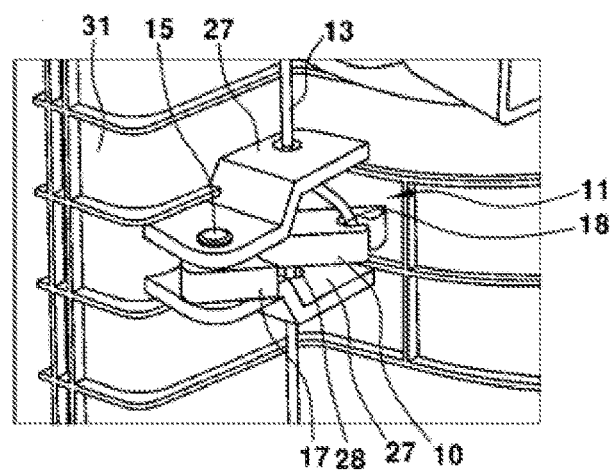

FIG. 2A, FIG. 2B, and FIG. 2C are perspective views illustrating the clamping portion of the apparatus for clamping the door trim according to various embodiments of the present invention. As shown in FIG. 2A, FIG. 2B, and FIG. 2C, the clamping portion 11 is a portion that substantially catches and fixes the door trim 31 to the door panel 32, and includes a hook 10 that rotates by the tension of the wire 13.

A groove portion 18 is formed at one end portion of the hook 10, and the wire 13 can be caught in the groove portion 18 at this time. In other words, the wire 13 is caught in the groove portion 18 in a vertically penetrating state.

In addition, at the other end portion of the hook 10, a wedge-shaped hook 17 is formed, and the hook portion 17 can enter and be caught in the pin 15 of the door panel 32 at this time. Such a hook 10 is installed on the door trim 31 side in a structure which is rotatably supported by the pin 15, for example, two upper and lower brackets 27 are formed on the back surface of the door trim 31, the hook 10 is horizontally inserted and positioned between the brackets 27 thus formed, and the upper and lower brackets 27 and the hook 10 therebetween are clamped by the pin 15. Accordingly, the hook 10 can rotate around the pin 15 that penetrates at a position adjacent to the hook portion 17.

Moreover, the upper and lower brackets 27 are formed with wire holes 28 through which the wire 13 can pass through, and thus, the wire 13 are inserted and extended along a path that passes through the wire hole 28 in the upper (or lower) bracket 27→the groove portion 18 in the hook 10→the wire hole 28 in the lower (or upper) bracket 27.

At this time, the position of the wire 13 caught in the groove portion 18 of the hook 10 is located on an outer side (a farther side based on the back surface of the door trim) of the position of the wire 13 that passes through the wire hole 28 of the bracket 27, and thus, the wire 13 that has passed through the wire hole 28 can be caught in the groove portion 18 of the hook 10 while the direction is bent outward.

Moreover, on the back side of the hook 10, a hook spring 19 mounted in a structure interposed between the hook 10 and the back surface of the door trim 31, for example, a hook spring 19 having a form in which a plate is bent in a "V" shape is provided.

Therefore, the one end portion of the hook 10, that is, the one end portion having the groove portion 18 is located outside at all times by the elastic force exerted by the hook spring 19, and finally, in a state in which the tension does not act on the wire 13, the position of the wire 13 extending over the groove portion 18 can be placed outside the position of the wire 13 passing through the wire hole 28.

Figures 3A, 3B:
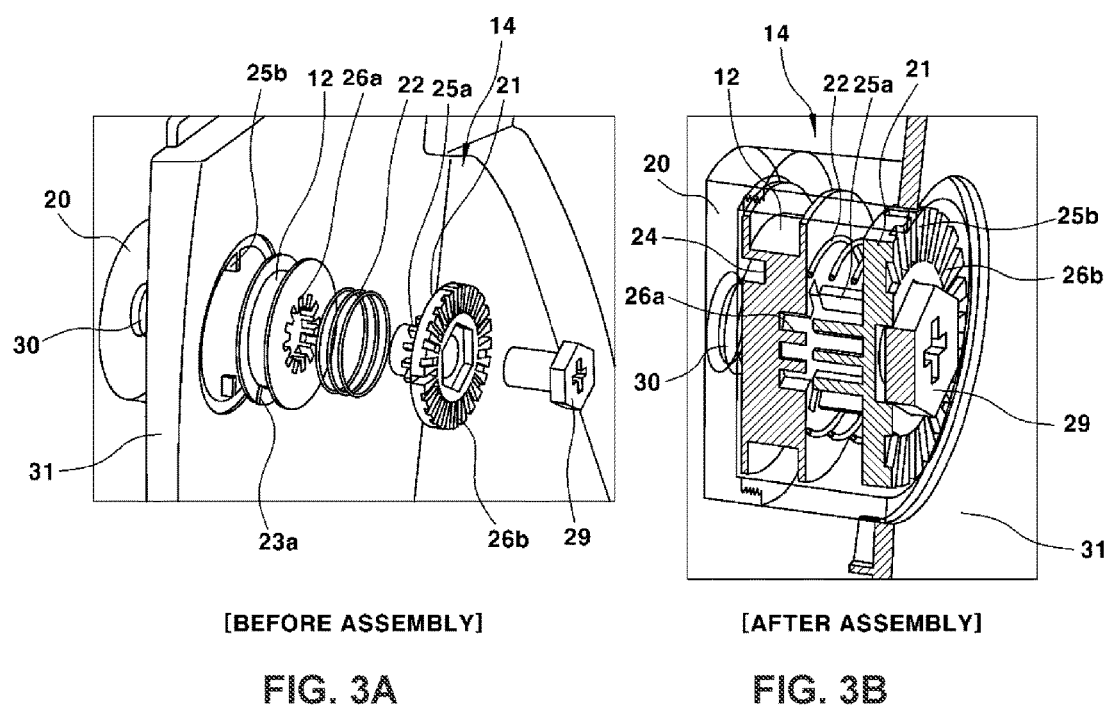
FIG. 3A and FIG. 3B are perspective views showing the locking portion of an exemplary apparatus for clamping a door trim according to the present invention.

FIG. 3A and FIG. 3B are perspective views showing the locking portion of the apparatus for clamping the door trim according to various embodiments of the present invention. As shown in FIG. 3A and FIG. 3B, the locking portion 14 is a portion that operates the hook 10 of the clamping portion 11 while pulling or unwinding the wire 13, and includes a locking base 20 installed in a structure fixed by being inserted into a hole in the door trim 31.

The locking base 20 is a portion that accommodates a pulley 12, a clamp 21 or the like to be described below, and has a structure in which a cover portion having a base shaft 30 and a cylindrical portion are coupled to each other by screw clamping or the like. When clamping and finishing the cover portion in a state of sequentially inserting the clamp 21, the clamp spring 22, and the pulley 12 into the cylindrical portion, the clamp 21, the clamp spring 22, and the pulley 12 can be accommodated inside the locking base 20.

Moreover, around the inner periphery of the leading end portion of the locking base 20, that is, around the inner periphery of the leading end portion of the cylindrical portion, a plurality of engaging protrusions 25b, for example, four engaging protrusions 25b disposed at intervals of 90° are formed, and at this time, as the engaging protrusions 25b are inserted into the engaging grooves 26b in the clamp 21, the rotation of the clamp 21 can be restricted.

The pulley 12 is provided as a means for substantially pulling or unwinding the wire 13, and the pulley 12 at this time can be installed in the rotatable structure by being inserted into the base shaft 30 or a boss portion of the clamp 21 to be described below through its central portion inside the locking base 20.

In the back surface portion of the pulley 12, as a means that can catch the wire 13, wire entry portions (reference numerals 23a and 23b in FIG. 4) having a phase difference of a predetermined angle to each other, and a wire insertion groove (reference numeral 24 in FIG. 4) formed along the circumferential direction while communicating with both wire entry portions 23a and 23b are provided.

Figure 4:
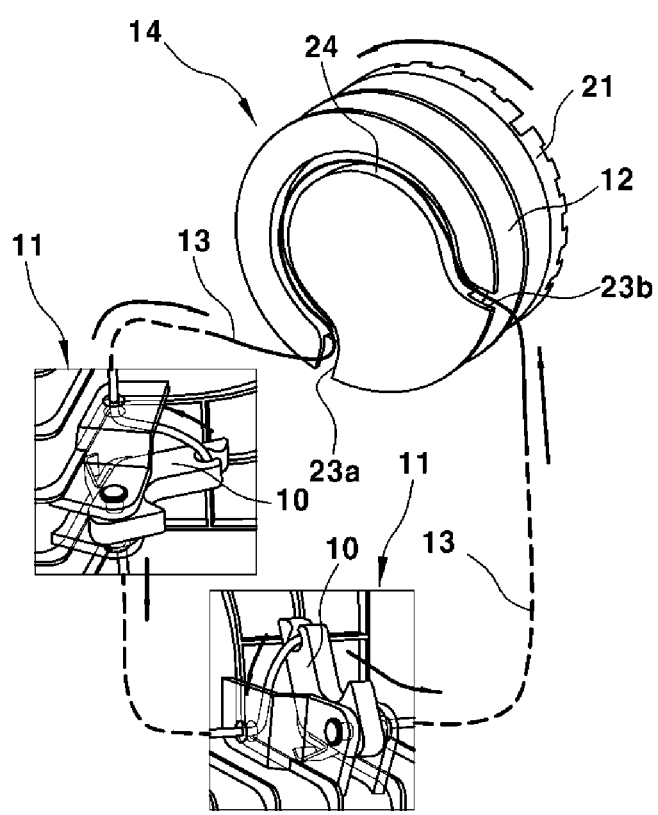
FIG. 4 is a perspective view showing an interlocking relation between the locking portion and the clamping portion in an exemplary apparatus for clamping a door trim according to the present invention.

At this time, referring to FIG. 4, the wire entry portions 23a and 23b are located at a distance interval forming an angle of about 90° to each other, the wire 13 entering through one wire entry portion 23a turns around the wire insertion groove 24, and then exits from the other wire entry portion 23b.

Thus, when the pulley 12 rotates, the entire wire portion can be switched into a tight tension state, while both sides of the wire 13 connected in one piece while being extended from both wire entry portions 23a and 23b are simultaneously pulled, that is, while the wire portion extended from one wire entry portion 23a and the wire portion extended from the other wire entry portion 23b are simultaneously pulled.

Along with this, in the hook 10 of the clamping portion 11, the side of the groove portion 18 over which the wire 13 extends is tilted inward, and at the same time, the hook 10 rotates about the pin 15, and finally, the hook portion 17 side is tightly engaged within the door panel side hole by the rotation of the hook 10.

Also, on the front part of the pulley 12, a plurality of engaging grooves 26a formed at regular intervals while going along the inner circumferential surface of the pulley are provided, and since the engaging protrusion 25a of the clamp 21 is inserted to the engaging groove 26a and is caught in a direction to be rotated, the clamp 21 and the pulley 12 can be engaged with each other and rotate integrally.

The clamp 21 is provided as a means for an operator to operate in practice, and the clamp 21 is installed in a structure that is concentrically disposed side by side on the front side of the pulley 12 inside the locking base 20, can rotate and can move in the axial direction.

Here, a boss portion formed to extend in the axial direction from the center or center portion of the back surface of the clamp 21 can be inserted to the base shaft 30 of the locking base 20 in a structure that can slide inward or outward.

Such a clamp 21 can rotate with the pulley 12 while being selectively engaged with the pulley 12 side or can be separated from the pulley 12 side, and can also be selectively engaged and restricted to the locking base 20 side, or can freely rotate when the restriction is released.

Thus, on the back surface of the clamp 21, a plurality of engaging protrusions 25a formed along the circumferential direction is provided at regular intervals, and the engaging protrusions 25a can be engaged while being inserted into the engaging groove 26a in the pulley 12.

At this time, the engaging protrusion 25a of the clamp 21 and the engaging groove 26a of the pulley 12 can be formed at a pitch interval identical to each other.

Thus, when pushing the clamp 21 inward along the axial direction, the engaging protrusion 25a of the clamp 21 is engaged with the engaging groove 26a of the pulley 12 while being inserted, and finally, when rotating the clamp 21, the pulley 12 can also rotate together.

Moreover, on the front surface of the clamp 21, a plurality of engaging grooves 26b formed along the circumferential direction at regular intervals are provided, and the engaging protrusion 25b in the locking base 20 can be inserted to and engaged with the engaging groove 26b.

Thus, when pushing the clamp 21 inward along the axial direction, the engagement between the engaging protrusion 25b and the engaging groove 26b is disengaged, and finally, at this time, the clamp 21 can rotate.

Moreover, when there is no pressing operation to the clamp 21, the clamp 21 is pushed outward by receiving the elasticity of the clamp spring 22 resiliently interposed between the clamp 21 and the pulley 12, and thus, at this time, rotation of the clamp 21 can be restricted while engagement between the engaging protrusion 25b and the engaging groove 26b in a direction to be rotated is maintained.

In particular, in some embodiments, the clamp 21 is provided with approximately four engaging grooves 26b having a depth relatively deeper than the remaining engaging grooves 26b among the plurality of engaging grooves 26b formed on the front surface.

Therefore, when the engaging protrusion 25b of the locking base 20 is engaged with the engaging groove 26b having the deeper depth in the clamp 21, at this time, while the clamp 21 is located at a position that moves to the outermost side, the engagement between the clamp 21 and the pulley 12 is released, and at this time, the pulley 12 can be in a freely rotating state without interference from the clamp 21.

Moreover, when the engaging protrusion 25b of the locking base 20 is engaged with the engaging groove 26b having a shallow depth in the clamp 21, at this time, the clamp 21 is engaged with the pulley 12 while being located at a position that moves inward, and at this time, in a state in which the pulley 12 and the clamp 21 are engaged with each other, the rotation restriction state can be provided.

Also, as a means for easy rotation operation of the clamp 21, a clamping bolt 29 is provided. The clamping bolt 29 is mounted on the inner circumferential surface of the boss portion of the clamp 21 by a clamping structure, and is mounted in a structure that is settled into a groove portion formed on the central portion of the front surface of the clamp 21 through the head portion. Thus, when an operator turns the clamping bolt 29 by a tool such as a screwdriver, it is possible to easily rotate the clamp 21.

Figure 5A:
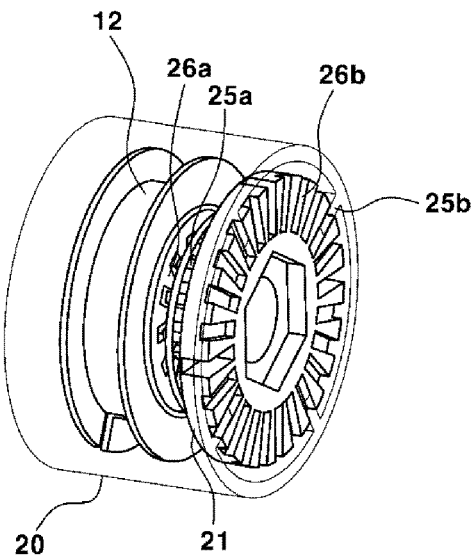
FIG. 5A, FIG. 5B, FIG. 5C and FIG. 5D are perspective views showing an operation state of the locking portion in an exemplary apparatus for clamping a door trim according to the present invention.

FIG. 5A, FIG. 5B, FIG. 5C and FIG. 5D are perspective views showing an operation state of the locking portion in the apparatus for clamping the door trim according to various embodiments of the present invention. FIG. 5A shows a state in which there is no engagement between the clamp 21 and the pulley 12. At this time, the pulley 12 is in a freely rotatable state, and an operation of temporarily clamping the door trim to the door panel can be performed by the operator.

Figure 5B:
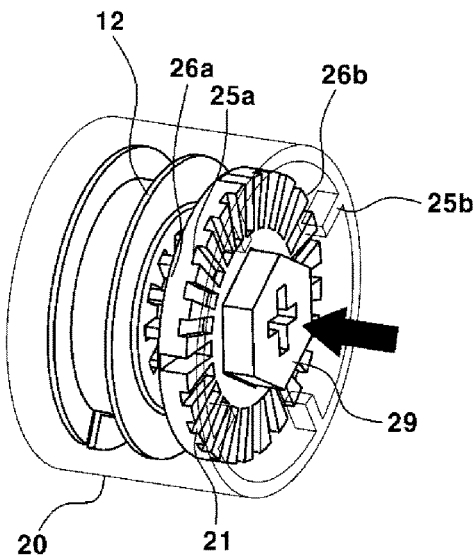

FIG. 5B shows a state in which the clamp 21 and the pulley 12 are engaged with each other. In other words, when pushing the entire clamp 21 including the clamping bolt 29 inward, the clamp 21 and the pulley 12 are engaged with each other while the engaging protrusion 25a of the clamp 21 is caught in the engaging groove 26a of the pulley 12, and the engagement between the clamp 21 and the locking base 20 is disengaged, while the engaging groove 26b exits from the engaging protrusion 25b of the locking base 20.

Figure 5C:
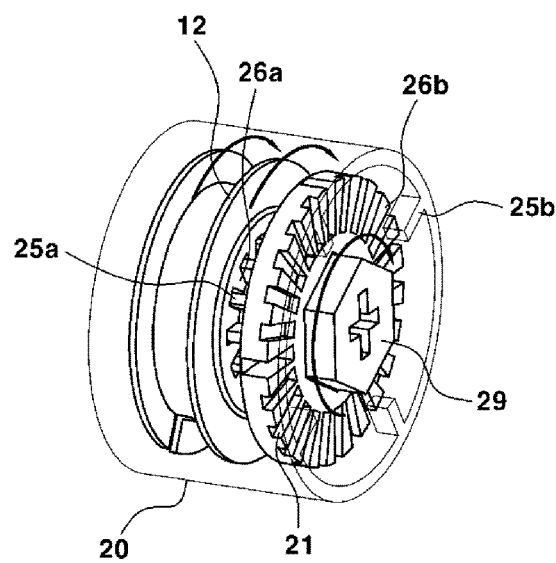

FIG. 5C shows a state in which tension is applied to the wire 13 by rotationally operating the clamp 21 and the pulley 12, that is, the wire 13 is pulled. That is, when rotating the clamp 21 and the pulley 12 engaged with each other in a clockwise direction, the wire 13 wound around the pulley 12 is pulled, finally while the hook 10 in the clamping portion 11, that is, the hook 10 temporarily clamped to the hole 16 of the door panel 32 through the hook portion 17 is further tilted (rotated) by the tension of the stretched wire 13, and while the hook 10 is tightly caught in the hole 16, the door panel and the door trim can be strongly clamped to each other.

Figure 5D:
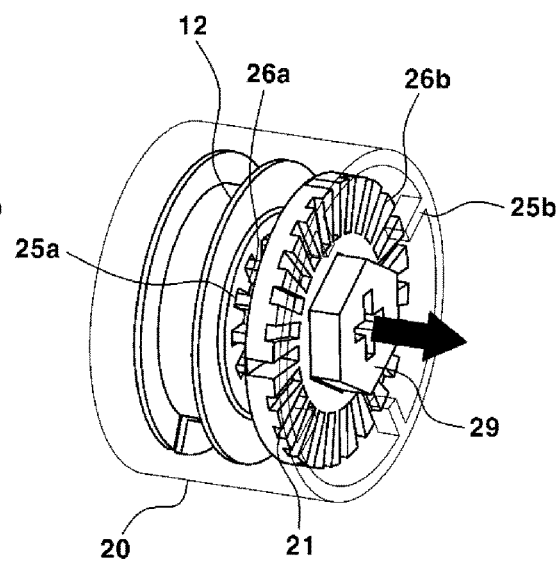
Figure 6A:
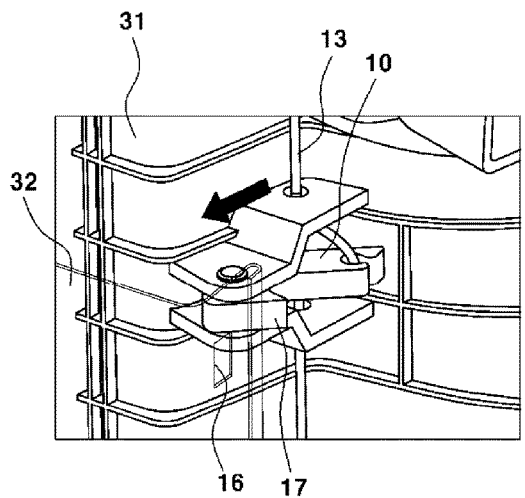
FIG. 6A, FIG. 6B, FIG. 6C and FIG. 6D are perspective views showing an operation state of the clamping portion in an exemplary apparatus for clamping a door trim according to the present invention.
Figure 6B:
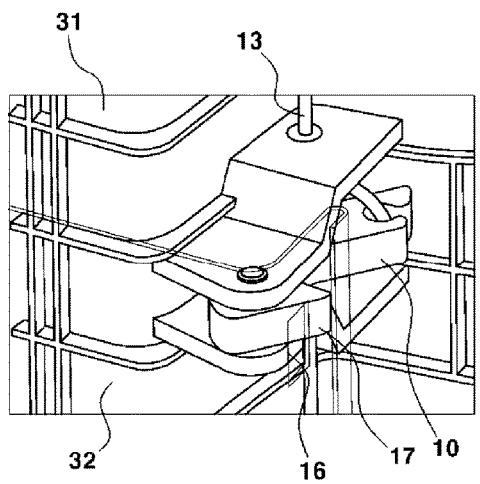
Figure 6C:
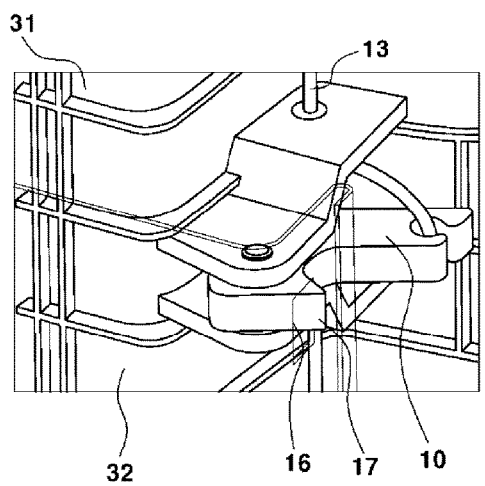
Figure 6D:
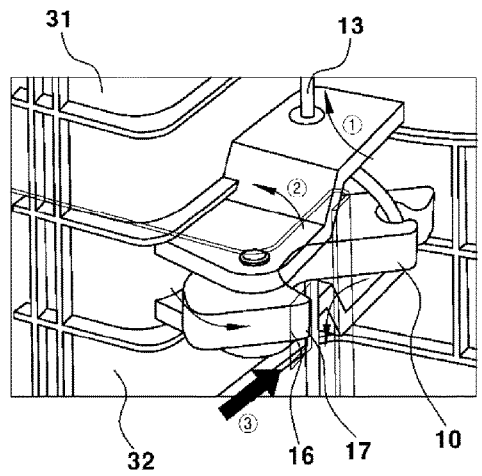
Figure 7A:
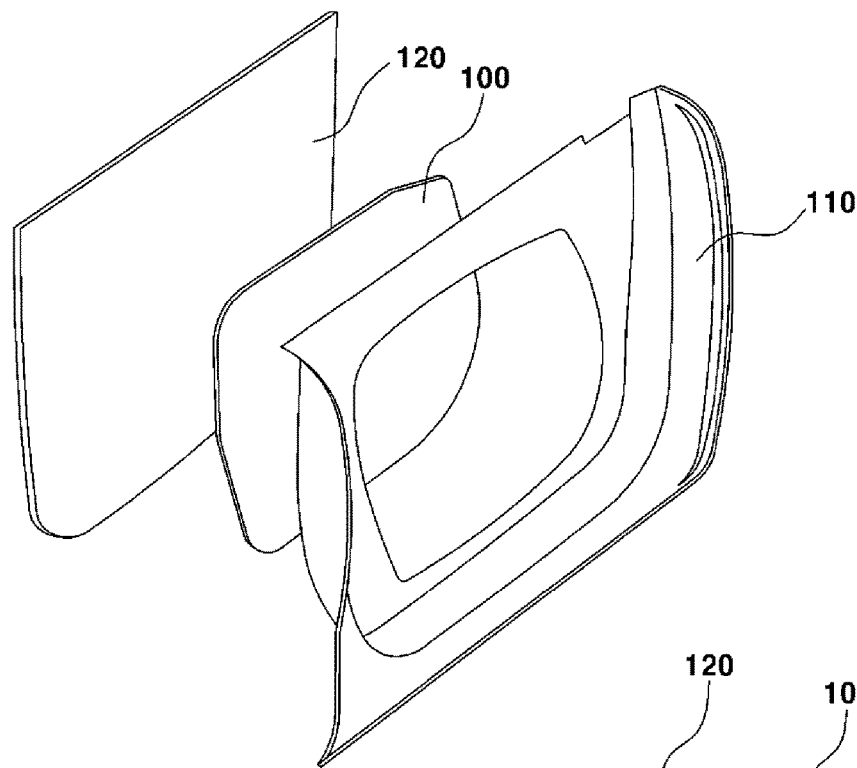
FIG. 7A, FIG. 7B and FIG. 7C are perspective view and a cross-sectional view showing a door trim of a conventional vehicle.
Figure 7B:
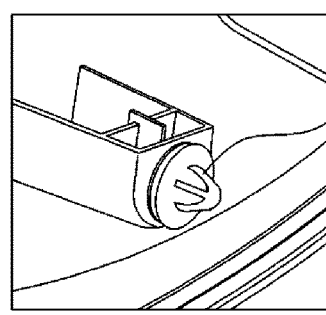
Figure 7C:
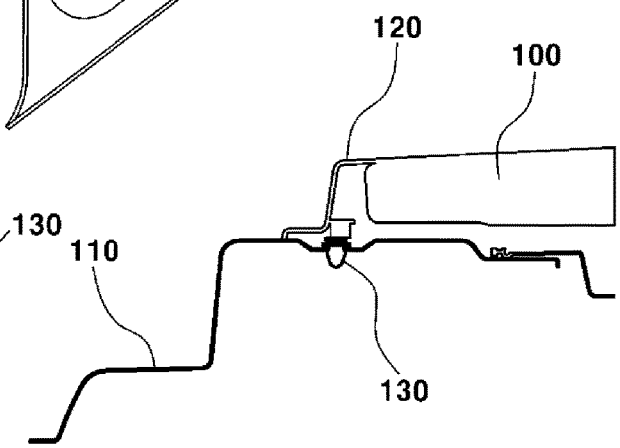

FIG. 5D shows a state in which the rotation of the clamp 21 and the pulley 12 engaged with each other is restricted. That is, in a state in which the wire is pulled through rotation, when the force is slightly removed from the pressed clamp 21, since the clamp 21 is caught in the engaging protrusion 25b of the locking base 20 through the engaging groove 26b, that is, the engaging groove 26b having a shallow depth, while moving outward by force of the compressed clamping spring 22, the rotation is restricted in the state in which the clamp 21 and the pulley 12 are engaged with each other, and finally, the engagement state between the door trim and the door panel can be maintained while the wire unwinding is prevented.

Of course, in a case of disengaging the door trim, when pushing the clamp 21 inward and then rotating the clamp 21 in an opposite direction, the wire tension is released, and when the engaging groove 26b of the clamp 21, that is, the engaging groove 26b having a deeper depth is caught in the engaging protrusion 25b of the locking base 20 again, the engagement between the pulley 12 and the clamp 21 is disengaged, and it is possible to return the door trim and the door panel to the temporarily clamped state.

FIG. 6A, FIG. 6B, FIG. 6C and FIG. 6D are perspective views showing an operation state of the clamping portion in the apparatus for clamping the door trim according to various embodiments of the present invention. As an example, FIG. 6A, FIG. 6B, FIG. 6C and FIG. 6D show a process of assembling the door trim 31 to the door panel 32.

First, after the door trim 31 is brought closer to the door panel 32, the hook 10 of the clamping portion 11 in the door trim 31 is positioned at the hole 16 in the door panel 32. At this time, the pulley 12 of the locking portion 14 is in a state that is disengaged from the clamp 21 and can freely rotate.

Next, when pushing the door trim 31 toward the door panel 32, at this time, the hook 10 is in a tilted state by slightly touching the door panel surface. When the hook 10 is slightly tilted, the pulley 12 rotates in a direction in which a wire length (a length of a portion exiting from the pulley and connected over the entire clamping portion) decreases.

Next, when further pushing the door trim 31 toward the door panel 32, the hook portion 17 of the hook 10 is inserted into the hole 16 of the door panel 32, and the hook 10 is restored to an original state again by force of the hook spring 19 (temporarily clamped state). When the hook 10 is restored to the state before the assembly start, the pulley 12 rotates in the direction in which the length of the wire increases.

When rotating the pulley 12 by operating the clamp 21 of the clamping portion 11 in the state in which the hook 10 of the door trim side is temporarily clamped to the door panel side, the wire 13 is pulled.

Next, as the wire 13 is pulled, the groove portion 18 of the hook 10 is pulled to the trim side, and at the same time, since the hook portion 17 of the hook 10, that is, the hook portion 17 caught in the hole 16 of the door panel 32 in a temporarily clamped state is tightly clamped while relatively rotating to the panel side and while further pressing the panel side in the hole 16, the door trim 31 can be assembled in a state of being strongly clamped to the door panel 32 side.

In this way, in the present invention, by applying the locking portion of the simple operation and the clamping portion which exerts a strong clamping structure, the door trim can be firmly and stably assembled to the door panel.

For convenience in explanation and accurate definition in the appended claims, the terms "upper" or "lower", "vertical" or "horizontal" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for clamping a door trim of a vehicle comprising:
    a plurality of clamping portions installed on a door trim side and including hooks caught by a door panel side while rotating by tension of a wire;
    a locking portion that is installed on the door trim side and pulls the wire using a rotating pulley; and
    the wire that is in a closed loop form between the hooks of the plurality of the clamping portions and the pulley of the locking portion and rotates the hooks while being pulled by the rotation of the pulley,
    wherein one or each clamping portion comprises a hook spring that resiliently supports a hook of the one or each clamping portion, while being mounted in a structure interposed between a door trim side inner surface and a back surface of the hook.

2. The apparatus of claim 1, wherein the hook of the one or each clamping portion is rotatably supported on the door trim side by a pin, and comprises a hook portion caught in a hole of the door panel side and a groove portion that slidably catches the wire.

3. The apparatus of claim 1, wherein the locking portion comprises:
    a locking base installed on the door trim side;
    the pulley s installed inside the locking base in a rotatable structure to pull or unwind the wire;
    a clamp that is installed in a structure rotatable inside the locking base and axially movable, wherein the clamp is able to rotate while being selectively engaged with the pulley, or the rotation of the clamp is restricted while the clamp is selectively engaged with the locking base; and
    a clamping spring that is resiliently interposed between the pulley and the clamp.

4. The apparatus of claim 3, wherein the pulley is provided with, as a means capable of catching the wire, wire entry portions having a phase difference of a predetermined angle between the entry portions, and a wire insertion groove formed along a circumferential direction while communicating with the wire entry portions.

5. The apparatus of claim 3, wherein the pulley and the clamp are engaged with each other through an engagement structure between a plurality of engaging grooves of a first predetermined interval formed along an inner circumferential surface of the pulley and a plurality of engaging protrusions of a second predetermined interval formed on a back surface of the clamp along a circumferential direction.

6. The apparatus of claim 3, wherein the rotation of the clamp is restricted by an engagement structure between a plurality of engaging grooves of a first predetermined interval formed along a circumferential direction on a front surface of the clamp and a plurality of engaging protrusions of a second predetermined interval formed along an inner circumferential surface of the locking base.

7. The apparatus of claim 3, wherein the clamp is configured so that a disengaged state with the pulley is maintained while the clamp is caught by an engaging protrusion of the locking base through a corresponding engaging groove having a depth deeper than other engaging grooves among a plurality of engaging grooves formed on a front surface of the clamp.

8. An apparatus for clamping a door trim of a vehicle comprising:
    a plurality of clamping portions installed on a door trim side and including hooks caught by a door panel side while rotating by tension of a wire;
    a locking portion that is installed on the door trim side and pulls the wire using a rotating pulley; and
    the wire that is in a closed loop form between the hooks of the plurality of the clamping portions and the pulley of the locking portion and rotates the hooks while being pulled by the rotation of the pulley,
    wherein the locking portion comprises:
        a locking base installed on the door trim side;
        the pulley that is installed inside the locking base in a rotatable structure to pull or unwind the wire;
        a clamp that is installed in a structure rotatable inside the locking base and axially movable, wherein the clamp is able to rotate while being selectively engaged with the pulley, or the rotation of the clamp is restricted while the clamp is selectively engaged with the locking base; and
        a clamping spring that is resiliently interposed between the pulley and the clamp.

9. The apparatus of claim 8, wherein the pulley is provided with, as a means capable of catching the wire, wire entry portions having a phase difference of a predetermined angle between the entry portions, and a wire insertion groove formed along a circumferential direction while communicating with the wire entry portions.

10. The apparatus of claim 8, wherein the pulley and the clamp are engaged with each other through an engagement structure between a plurality of engaging grooves of a first predetermined interval formed along an inner circumferential surface of the pulley and a plurality of engaging protrusions of a second predetermined interval formed on a back surface of the clamp along a circumferential direction.

11. The apparatus of claim 8, wherein the rotation of the clamp is restricted by an engagement structure between a plurality of engaging grooves of a first predetermined interval formed along a circumferential direction on a front surface of the clamp and a plurality of engaging protrusions of a second predetermined interval formed along an inner circumferential surface of the locking base.

12. The apparatus of claim 8, wherein the clamp is configured so that a disengaged state with the pulley is maintained while the clamp is caught by an engaging protrusion of the locking base through a corresponding engaging groove having a depth deeper than other engaging grooves among a plurality of engaging grooves formed on a front surface of the clamp.

13. An apparatus for clamping a door trim of a vehicle comprising:
- a plurality of clamping portions installed on a door trim side and including hooks caught by a door panel side while rotating by tension of a wire;
- a locking portion that is installed on the door trim side and pulls the wire using a rotating pulley; and
- the wire that is in a closed loop form between the hooks of the plurality of the clamping portions and the pulley of the locking portion and rotates the hooks while being pulled by the rotation of the pulley,
- wherein a hook of one or each clamping portion is rotatably supported on the door trim side by a pin, and comprises a hook portion caught in a hole of the door panel side and a groove portion that slidably catches the wire, and
- wherein the one or each clamping portion comprises a hook spring that resiliently supports the hook, while being mounted in a structure interposed between a door trim side inner surface and a back surface of the hook.

* * * * *